ARITHMETIC UNIT USING MAGNETIC CORE COUNTERS

Filed Dec. 18, 1953 5 Sheets-Sheet 1

INVENTOR.
GORDON E. WHITNEY
BY William V. Schellberg
AGENT

Feb. 2, 1960 G. E. WHITNEY 2,923,472

ARITHMETIC UNIT USING MAGNETIC CORE COUNTERS

Filed Dec. 18, 1953 5 Sheets-Sheet 2

*INVENTOR.*
GORDON E. WHITNEY

BY William V. Schelberg

AGENT

Feb. 2, 1960 G. E. WHITNEY 2,923,472

ARITHMETIC UNIT USING MAGNETIC CORE COUNTERS

Filed Dec. 18, 1953 5 Sheets-Sheet 3

INVENTOR.
GORDON E. WHITNEY
BY William V. Schellberg
AGENT

Feb. 2, 1960

G. E. WHITNEY 2,923,472

ARITHMETIC UNIT USING MAGNETIC CORE COUNTERS

Filed Dec. 18, 1953

5 Sheets-Sheet 4

INVENTOR.
GORDON E. WHITNEY
BY William V. Schellberg
AGENT

INVENTOR.
GORDON E. WHITNEY
BY
AGENT

United States Patent Office 2,923,472
Patented Feb. 2, 1960

2,923,472

ARITHMETIC UNIT USING MAGNETIC CORE COUNTERS

Gordon Earle Whitney, Derby, Colo., assignor to International Business Machines Corporation, New York, N.Y., a corporation of New York Application December 18, 1953, Serial No. 399,047

9 Claims. (Cl. 235—160)

This invention relates to an arithmetic unit composed of magnetic core components and which is capable of performing the functions of addition and multiplication in response to the sensing of perforations in a record card.

Components for handling and storing digital information are employed throughout large scale computers and statistical information processing devices and there has been a trend generally to replace vacuum tube elements of such components with other devices which are more reliable, more economical in operation and have longer life as well as occupying less volume.

The present invention is based upon the properties of known type magnetic materials in functioning as bistable elements in representing binary digits in components of an arithmetic unit. Components employing magnetic cores are advantageous as they require no steady state power such as the plate dissipation of an electronic trigger or the holding current for an electromagnetic relay. Additionally, they require no filament power and consequently generate negligible heat so that they may be stacked in compact arrays. Further, the service life of a magnetic core is essentially infinite and its memory is independent of power supply failures so that it is inherently reliable.

Accordingly, the principal object of the present invention is to provide an arithmetic unit employing magnetic core components whereby the functions of accumulation and multiplication of digital information may be accomplished at high speed and with increased reliability.

The principal magnetic core component of the system organization to be described is a device forming the subject matter of my copending United States patent application, Number 394,369, which was filed November 25, 1953, now abandoned. This device consists of a plurality of magnetic cores having windings arranged in a circuit in such a manner that as one core is driven from an alternative residual magnetic state to a normal residual magnetic state the next successive core is driven from its normal to its alternative magnetic state. A single driving line influences all the cores to return them to their normal residual states so that if any one of the cores is in an alternative state it will be driven to normal. Each core is provided with an output winding which acts during its change of state to normal to transmit a pulse to the next successive core immediately following this change in state and drive this next core from a normal to an alternative state. This transfer of alternative magnetic states from core to core proceeds successively in step by step fashion with each pulse applied to the drive line and is accomplished through the charging and discharging of a capacitor storage circuit which has been termed a self-timing transfer delay circuit since its timing characteristic is determined by the value of its associated circuit components.

A feature of the present invention resides in providing an organization of magnetic core elements having the transfer arrangement described in forming a pulse producing device which is controlled by signals directed thereto by data input means. In accordance with this feature the alternative magnetic state is circulated in step by step fashion around a closed ring of ten cores a single time or a selected number of times under the control of a second similar organization of cores which is termed a cycle control counter. This arrangement finds utility in performing addition and multiplication by the process of iterative addition.

Another feature of the invention resides in the provision of plural groups of magnetic core counter units organized as accumulators. Pulses obtained from the above mentioned pulse producing device are directed to the accumulators in accordance with the functioning of data input means with the carry function between the several orders of the groups accomplished through use of magnetic core components which are also under the control of the pulse producing device.

Still another feature resides in the provision of novel control circuits for reading out the accumulator groups selectively under control of the magnetic core pulse producing device while retaining the information for further arithmetic functions.

A further feature of the invention resides in the provision of novel control circuits for selectively resetting both the accumulators and the cycle control counter components to zero positions in clearing the arithmetic unit.

Other objects and features of the invention will be pointed out in the following description and claims and illustrated in the accompanying drawings, which disclose, by way of example, the principles of the invention and the best mode, which has been contemplated, of applying these principles.

In the drawings, which consist of 5 sheets having 7 figures.

Figs. 3, 4, 5 and 6 combined, form a circuit diagram illustrating the arithmetic unit in schematic form.

Figure 7:
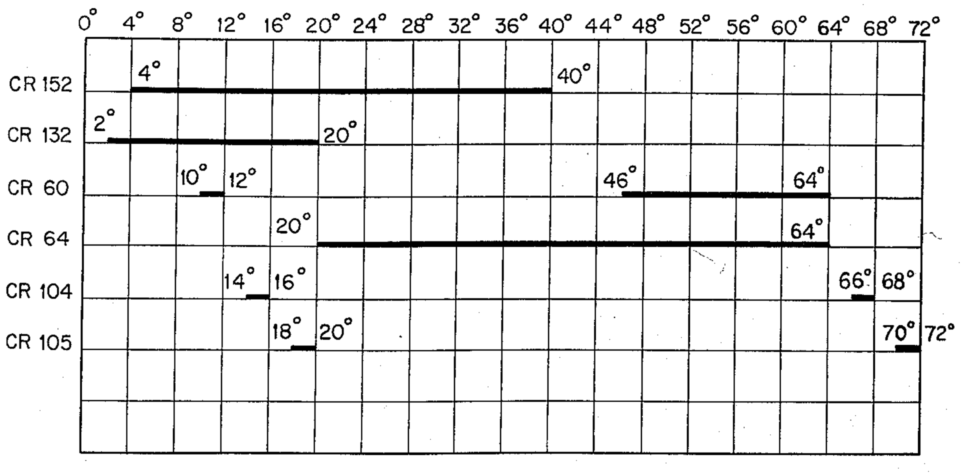

Fig. 7 is a timing chart showing cyclic periods of closure of the contacts employed in the circuit organization of Figures 3 to 6.

Figure 1:
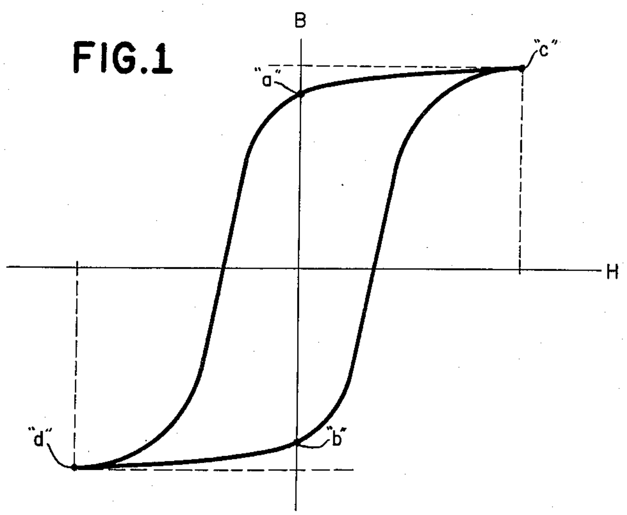
Fig. 1 is a representation of an idealized hysteresis loop for magnetic material such as that employed in the cores of the components used for the purposes of the present invention.

The bistable magnetic cores employed for the purposes of the present invention are interlinked with an input winding and a drive winding which, when selectively energized, cause the core to be magnetized in one or the other remanence direction. An output winding positioned about the core develops an induced voltage as a result of the change in flux occasioned by shifting the magnetic state of the core. Figure 1 illustrates an idealized hysteresis loop for commercially obtainable magnetic material. If a core of such material is in the state of remanence indicated by the point "*a*," application of a positive magneto-motive force causes it to traverse the hysteresis curve to point "*c*" and, upon relaxation of this positive force, returns to point "*a*." Application of a negative magnetomotive force, greater than the coercive force, causes the curve to be traversed to point "*d*" and when the force is terminated, goes to point "*b*." Similarly, with the core standing at point "*b*" application of a negative magnetomotive force causes the curve to be traversed to point "*d*" and return when the negative force is relaxed, while a positive force, greater than the coercive force, causes a traversal of the curve from point "*b*" to point "*c*" and return to point "*a*" when the positive force is terminated.

Points "*a*" and "*b*" are stable remanence states readily adapted for representing binary information and the cores may be driven to one or the other of these two states by energizing the drive or input windings. A change in state is observed through the voltage pulse induced in the output winding as the magnetic field in one direction collapses and builds up in the other direction. With point "*a*" arbitrarily selected as representing a binary "one" state and point "*b*" a binary "zero" state, application of a negative force by pulsing the drive winding causes a voltage to be induced in the output winding simultaneously if a "one" is stored, while a negligible voltage is induced in the output winding if a "zero" is stored.

Figures 2, 5:
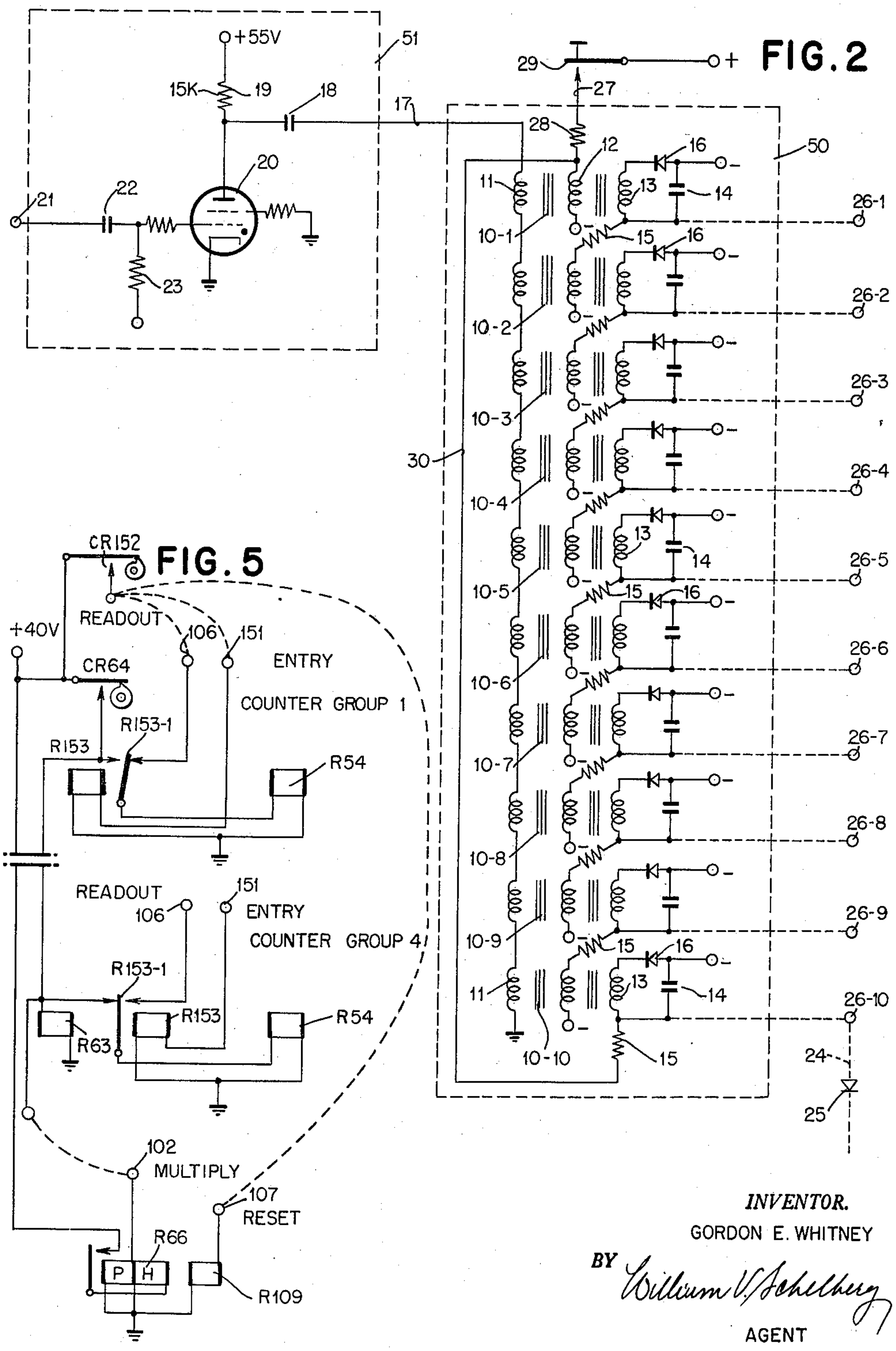
Fig. 2 is a schematic circuit diagram of the basic counting and pulse producing device.

An organization of cores forming a counter device such as that described in my aforementioned copending application is illustrated in Figure 2. This component comprises the principal basic unit employed in the arithmetic device and will be briefly described in connection with this figure.

Ten magnetic cores 10 having appropriate subscript labels are arranged in cascade to form a decimal device. Each of the cores is provided with a drive winding 11, and input winding 12 and an output winding 13. The output winding 13 of each core is coupled to one terminal of the input winding 12 of the next adjacent core by means of a transfer circuit including a capacitor 14, a resistor 15 and a diode 16. The remaining terminal of the windings 12 and the junction of the diodes 16 and capacitor 14 are based negatively by a potential source not shown. The drive windings 11 of each of the ten cores are connected in series with one terminal of the series circuit grounded and the other terminal coupled through a lead 17 to a drive pulse source including a condenser 18, which is connected to a positive voltage source through a resistor 19, and to the plate of a 2D21 tube labeled as element 20. The cathode electrode of the tube 20 is grounded and its grid connected to an input terminal 21 through a coupling capacitor 22. Suitable grid bias is provided through a negative source of voltage and is applied to the grid circuit through a resistor 23. With the device employed as a pulse producing component, output terminals labeled 26–1 through 26–10 are provided connected to a similar junction point of the output windings associated with cores 10–1 through 10–10 respectively. With the device employed as a counter component without accumulation or as an accumulator, a reset lead 27 is employed which is coupled to the input winding 12 of the first core 10–1 through a further resistor element 28.

Each of the cores 10 is initially placed in a "zero" remanence state, then core 10–1 may be placed in a "one" remanence state by energizing its input winding 12. For purposes of explanation as shown in the figure, this may be initially accomplished by closure of a switch 29 connecting a positive voltage source not shown to the unbiased terminal of the core 10–1 input winding through the lead 27 and resistor 28. In operation of the device as a closed ring the pulse output from the core 10–10 is applied to this terminal of the input winding 12 of core 10–1 through a lead 30 and the switch 29 is not required. The binary "one" state existing in core 10–1 is sequentially transferred or circulated from core to core in step by step fashion in response to each drive pulse applied through the lead 17 to the series connected drive windings 11. Count pulses of positive polarity are applied to the aforementioned terminal 21 and to the grid of thyratron tube 20 causing the tube to conduct whereupon the condenser 18 connected to its plate discharges through tube 20 and the drive windings 11 of each counter core 10 in series.

Core 10–1 is the only core that switches remanence state as it is driven from point "*a*" to point "*d*" and goes to point "*b*" when condenser 18 is fully discharged, while the other cores are driven from point "*b*" to point "*d*" and return to point "*b*." A significant voltage is induced only in the output winding 13 of core 10–1 and the associated capacitor 14 is charged as core 10–1 is switched. The inductance of the drive windings 11 is reduced in the same relationship and condenser 18 discharges completely seeing an increasingly lower impedance. The drive tube 20 then cuts off, since the resistor 19 is sufficiently large to prevent continued conduction through the plate supply source. The charged condenser 14 now discharges through the resistor 15 and the input winding 12 of the next core 10–2 causing this core to switch to a "one" remanence state. Each succeeding input pulse applied to the terminal 21 and the grid of tube 20 pulses the series connected drive windings 11 and causes a similar action to take place whereby the binary "one" remanence state is circulated from core to core. In using the arrangement of cores described as a pulse producing device, the output terminals 26–1 through 26–10 are subjected to a positive pulse at the time the associated core changes from a "one" to a "zero" state.

Figure 3:
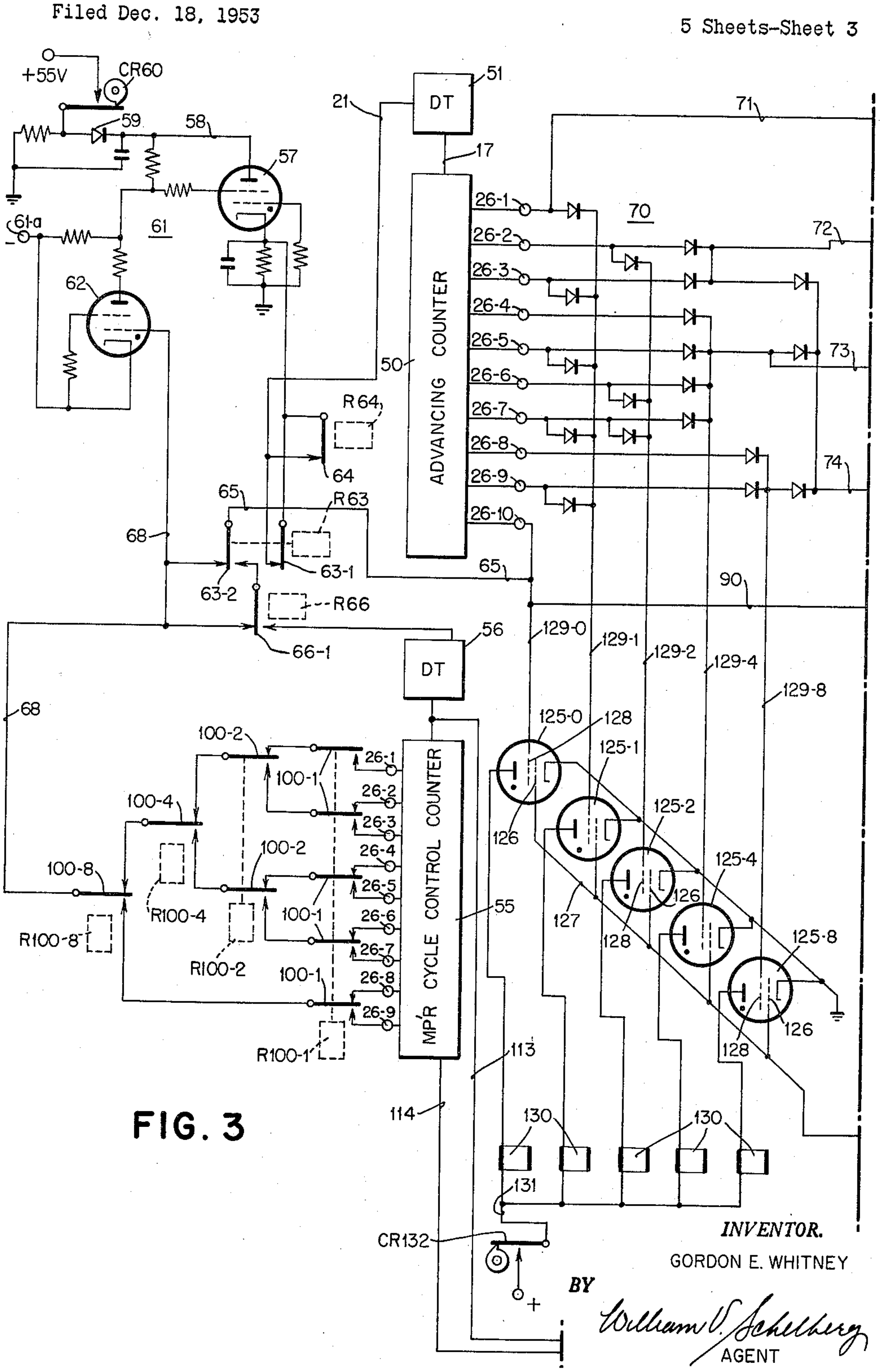
Figure 4:
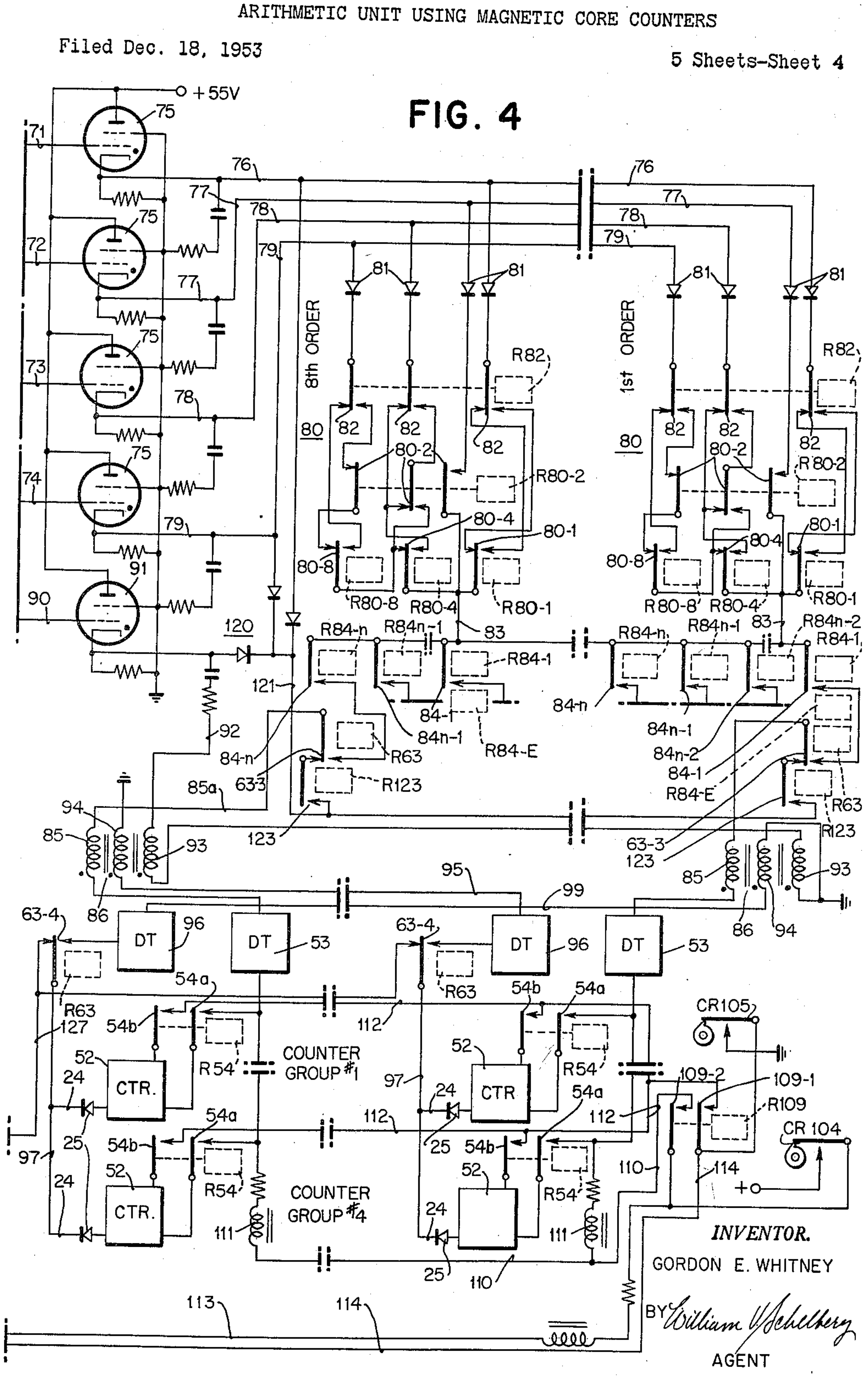

Referring now to Figures 3 and 4 of the drawings which illustrate the arithmetic unit organization, several forms of the counter device described are employed and are shown in block diagram form. At the upper portion of Figure 3, a pulse producing component having an advancing counter labeled as element 50 and a driving tube network labeled element 51 is shown. The advancing counter 50 is shown in block form and comprises a series of ten cores in an open chain arrangement such as that described having output terminals 26 employed for producing pulses as the drive tube unit 51 is operated from a basic pulse generator circuit. The drive tube network 51, also shown in block form, includes the tube 20, condenser 18 and other associated elements as previously described and shown enclosed in dotted lines in Figure 2.

In performing an accumulation operation, the pulse producing component 50 is caused to complete one cycle of operation and certain ones of the pulses appearing on the terminals 26 are selected in accordance with the value to be accumulated and are directed to another form of the basic counter wherein an indication of the number of pulses received is stored. The accumulator unit is shown in Figure 4 and comprises several groups of counters shown in block form. Each counter group has a number of individual units 52 sufficient to accommodate the number of orders of a multi-digit number of desired magnitude, however, only the first and last counter of two groups are illustrated for purposes of simplification.

A single drive tube network 53 is provided for each order of the several accumulator groups and is employed to drive a counter in the particular group upon closure of the contacts **54–*a* provided for that group directing the output of the network thereto. The drive tube network 53 is shown in block diagram form and consists of an organization of elements including a tube 20 and condenser 18 with associated circuitry such as that described in connection with Figure 2 and which is similar to the aforementioned unit 51. The counters 52 likewise are similar to the basic unit shown and described in connection with Figure 2, however, the output terminals 26** are not employed in this accumulator modification as previously mentioned.

In performing multiplication by iteration, the advancing counter 50 is caused to complete a number of cycles equal to the value of the multiplier. The control device for regulating this operation comprises another basic counter unit shown in Figure 3 which is termed the multiplier cycle control counter and is labeled as element 55.

This unit, which is also shown in block diagram form, is similar to the basic counter shown as element 50 in that output pulses appearing on terminals 26 are employed for the above mentioned controlling purposes. The multiplier cycle control counter 55 is also driven by a drive tube network 56 which is like the aforementioned units 51 and 53.

Means for driving the advancing counter 50 through one or more complete cycles is provided by a basic pulse generator comprising a tube 57. The plate of tube 57 is connected by a lead 58 and diode 59 to a cam operated switch CR60. Closure of CR60 energizes the line 58 from a +55 volt source not shown. A resistor network 61 is coupled to a negative bias source not shown through a terminal 61*a*, and to the plate and grid of the pulse generator tube 57 so as to normally bias it to cut off when the switch CR60 is opened. Network 61 is further coupled to a tube 62 which is termed the advancing counter cycle control tube. When rendered conductive, this tube functions to bias the pulse generator tube 57 to cut off through the resistor network 61 with switch CR60 open or closed as will be later described. The pulse generator output is taken from the cathode circuit of tube 57 and is applied to terminal 21 of the drive circuit 51 through a pair of normally closed relay operated contacts 63–1 and 64. These contacts are operated by relays as will be later described. The output terminal 26—10 of the advancing counter 50 is coupled through a lead 65 and the normally closed contacts of a switch 63–2 to a conductor 68 which is connected to the control grid of the aforementioned tube 62.

The terminals 26–1 through 26–9 of the advancing counter 50 are connected through a diode matrix 70 to four leads labeled 71, 72, 73 and 74. The diode matrix 70 connects combinations of the terminals 26 to the leads 71 through 74 in such a manner that a group of four thyratron pulse tubes 75 having their grids individually coupled to one of the latter leads is fired in predetermined order. The tube 75 having its grid energized from line 71 is fired as the first core 10–1 of the advancing counter is switched, the tube 75 coupled to line 72 is fired when cores 10–2 and 10–3 are switched, the tube 75 coupled to lead 73 is fired when the cores 10–4, 10–5, 10–6 and 10–7 are switched and the tube 75 connected to line 74 is fired when cores 10–2 through 10–9 are switched. As a result, groups of 1, 2, 4 and 8 distinct pulses, in accordance with the modified binary code, appear on lines 76, 77, 78 and 79 respectively, which are connected to the cathodes of the associated pulse tubes 75. The four lines 76 to 79 are connected to plural groups of entry storage relay points 80, one group being provided for each order of a digit to be accumulated or which is to be used as the multiplicand in an arithmetic program. Only the first and last of eight such groups are illustrated for purposes of simplicity, however, any desired number may be employed. Combinations of these switches are operated in response to the sensing of digit representing perforations in a record card and direct the proper groups of pulses from the aforementioned lines 76 to 79 through isolating diodes 81, a set of minus entry switches 82, the multiplicand and the accumulation entry storage points 80, leads 83, shift relay points 84, through entry contact 63–3, lead 85–*a* and coil 85 of a carry core 86 to the accumulator drive tube unit 53. The switch contacts 80 are operated by relay coils R80 that are held in an energized condition once the relay has been picked up through back contacts and a cam operated switch, not shown, that is adapted to close at the beginning of each card sensing interval and open after the card has passed the sensing station. The output from the drive tube network 53 is directed to drive one of the counters 52 as will be described hereinafter.

Carry between the several orders of the counters 52 of any group is provided by the tenth output pulse emitted by the advancing counter 50 (Fig. 3). This tenth pulse appears at terminal 26–10 of this unit and is applied to a lead 90 which connects with the control grid of a thyratron tube 91. An output taken from the cathode terminal of this tube appears on a ripple carry drive line 92 and is applied to windings 93 of the carry cores 86 which, as before mentioned, are provided for each order of the several counter groups. The windings 93 function as read out or drive windings for the carry cores. A winding 94 is also provided on each carry core 86 and is connected to the carry output lead 24 of the next lower order counter 52 of the groups through a lead 95, and a drive tube unit 96, shown in block form and which is similar to previously described elements 51 and 53, through the normally open entry contacts 63–4 and a lead 97. As a particular counter 52 passes its tens position on an entry of count pulses, the positive pulse produced on carry lead 24 follows the above described path pulsing core 86 and causing it to change from a "zero" to a "one" remanence state. Energization of winding 93 from the ripple carry line 92 at the end of an entry operation switches the changed core back to a "zero" state causing a voltage to be induced in the winding 85 associated with the carry core so that a single pulse is produced therein driving the next higher order counter 52 ahead one position in the same manner as in the entry of a single pulse through the entry storage points 80. End around carry from the highest to lowest order is provided by the drive tube 96 associated with the highest order counter 52 and a carry line 99.

The tenth output pulse from the advancing counter 50 causes the tube 62 to fire as previously described and biases the basic pulse generator tube 57 to cut off even though the cam operated contacts CR60 are closed during this period of the operating cycle as will be described hereafter. This allows only one group of pulses to be produced on the leads 76 to 79 and applied to the accumulating counters 52 in any one accumulation cycle.

Multiplication is performed by iterative addition of the multiplicand a number of times as controlled by the multiplier. The multiplier is set up in modified binary form by energization of relays in reading the multiplier from a punched card as will be described or may be transferred from one of the groups of counters 52 to energize relays in a similar manner in a read out cycle as will be described hereafter. The multiplier contact points are shown in Figure 3, labeled as elements 100–1, 100–2, 100–4 and 100–8 and direct a selected output pulse obtained from the multiplier cycle control counter component 55 to the line 68 and thence to the grid of the tube 62 to control the tube 57 and thereby the number of cycles the advancing counter 50 produces.

When multiplication is to be performed, a multiplier relay R66 shown in Fig. 5 is energized during closure of cam operated switch CR64, as represented by the heavy lines in the time chart in Figure 7, by plugwire connection or control switch not shown connecting the switch CR64 to the hub 102. This causes closure of the normally open switch contact 66–1 (Fig. 3) and each time the advancing counter 50 completes one cycle, the tenth output pulse is applied via the lead 65, the normally open entry contacts 63–2, which are closed on entry, and the normally open contacts 66–1 to the input of the drive unit 56 causing one pulse to be applied by this unit to the cycle control counter component 55. Depending upon the combination of switch points set up in the multiplier contact matrix 100, a pulse is delivered to lead 68 at the completion of the first through ninth cycle of operation of the control unit 55, causing the tube 62 to be fired and cut off the basic pulse generator tube 57 at that time.

To reset the accumulating counters 52 and the multiplier cycle control counter 55 to an initial state prior to accumulation or multiplication, as when the arithmetic unit is to be cleared, a pair of cam operated contacts CR104 and CR105 shown in Figure 4 are provided. To initiate resetting function hubs 106 and 107 (Fig. 5) are connected by plug wires or a control switch not shown, to be energized upon closure of the contacts CR152, energizing relays R54 and R109 which in turn cause the closure of contacts 109–1, 109–2, 54–*a* and 54–*b* (Fig. 4). Closure of cam contacts CR104 now connects a positive potential source to a line 110 which connects with the CR104 contacts through the contacts 109–2 and provides a positive potential through loading coils 111 and the 54–a contacts of the counters 52 of the particular group, holding the drive lines of each order counter of this group positive. This causes the particular accumulator counter holding a binary "one" state to read out, however, the capacitor 14 associated with the particular core (see Fig. 2) discharges through the input winding 12 of the next higher core without effecting its "zero" remanence state. Two degrees later in the read out cycle, contacts CR105 close (see Fig. 7) and the line 112 is connected to ground through contacts 109–1 and there is a current pulse through this circuit, the resistor 28 and the winding 12 (see Fig. 2) of the first core 10–1. The current through contacts 109–2 has terminated at this time so that the first core of each counter 52 switches to a "one" state. Leads 113 and 114 connect to similar points in the multiplier cycle control counter component 55 and cause the latter to be reset at the same time and in a similar manner. During a multiplication operation the plug wire or control switch connecting hub 107 with switch CR152 is open so that closure of the switches CR104 and CR105 is effective only to reset the cycle control counter 55 after entry of the multiplicand into the counters 52 a number of times as dictated by the multiplier order set up during that multiplier cycle.

Readout is accomplished by pulsing the counters 52 with ten pulses, driving them completely around one storage cycle and determining the digit stored by timing the receipts of a carry pulse output. For this purpose a diode matrix 120 (see Fig. 4) is provided which is connected to the leads 76 and 79 and to cathode output of the tube 91. Ten pulses are thus caused to appear on a lead 121, and, with the hub 106 (Fig. 5) of the order read out energized from the switch CR152 by means of plug wire or control contact not shown and switches 54–a closed, are applied to the drive windings of the selected counter order through a contact 123, normally closed contacts 63–3, leads 85a and coils 85. One cycle is required for each order of the selected counter groups as the manifesting apparatus is operated serially and the order to be read out is selected by closure of the order read out contact 123. As indicated in the drawing the contacts 123 are operated to close upon energization of relay R123 shown in dotted lines. These relays are energized order by order through an emitter, not shown, operated in synchronism with the passage of the record card in which the information is to be recorded through a manifesting unit.

The component employed for operation of the manifesting unit comprises a group of five counter output 2D21 gas tubes 125, shown having their control grids 126 connected in common to the carry output terminal of the selected counters 52 through a lead 127 and normally closed entry relay contacts 63–4. Screen grids 128 of each of the tubes are connected individually to a set of leads 129–0, 129–1, 129–2, 129–4 and 129–8. These leads are pulsed positively at times corresponding with the modified binary code and synchronized with counter read out as they are connected to the output terminals 26 of the advancing counter 50 through the aforementioned diode matrix 70. The plates of the tubes 125 are coupled through a set of read relays 130 to a lead 131 which connects them jointly to a positive source of potential not shown on closure of a cam operated switch CR132.

As mentioned above, the counters 52 are driven through one complete decimal cycle by the application of ten input pulses to determine the digit value held in storage. For example, if the counter order in question holds a value 3, then core 10–3 of that counter retains a binary one state. The first of the ten read pulses from matrix 120 transfers the binary one state from core 10–3 to core 10–4; the second pulse transfers the one state to core 10–5, etc., with the seventh pulse causing a transfer from core 10–9 to core 10–10 and the tenth causing a transfer to core 10–3. At the conclusion of the series of ten pulses the original storage condition is again attained. As these advancing pulses are developed through the diode matrix 70 they also appear individually on the leads 129. The 1st, 3rd, 5th, 7th and 9th pulses appear on lead 129–1 and are applied to the grid 128 of tube 125–1. The 2nd, 6th and 7th pulses are applied to the grid 128 of tube 125–2. The 4th, 5th, 6th and 7th pulses are applied to the grid 128 of tube 125–4. The 8th and 9th pulses appear on the grid 128 of tube 125–8 and the 10th appears on lead 129–0 and is applied to the grid 128 of tube 125–0. At the time the binary one state in the counter 52 passes from core 10–9 to core 10–10 and a pulse is developed on the line 127, certain combinations of the tubes 125 are conditioned for operation by the pulses on the grids 128. In the example taken, this occurs on delivery of the seventh pulse when tubes 125–1 and 125–2 are conditioned. Both of these tubes fire and energize the relays 130 to manifest the digit 3 in accordance with the modified 01248 binary code.

Figure 6:
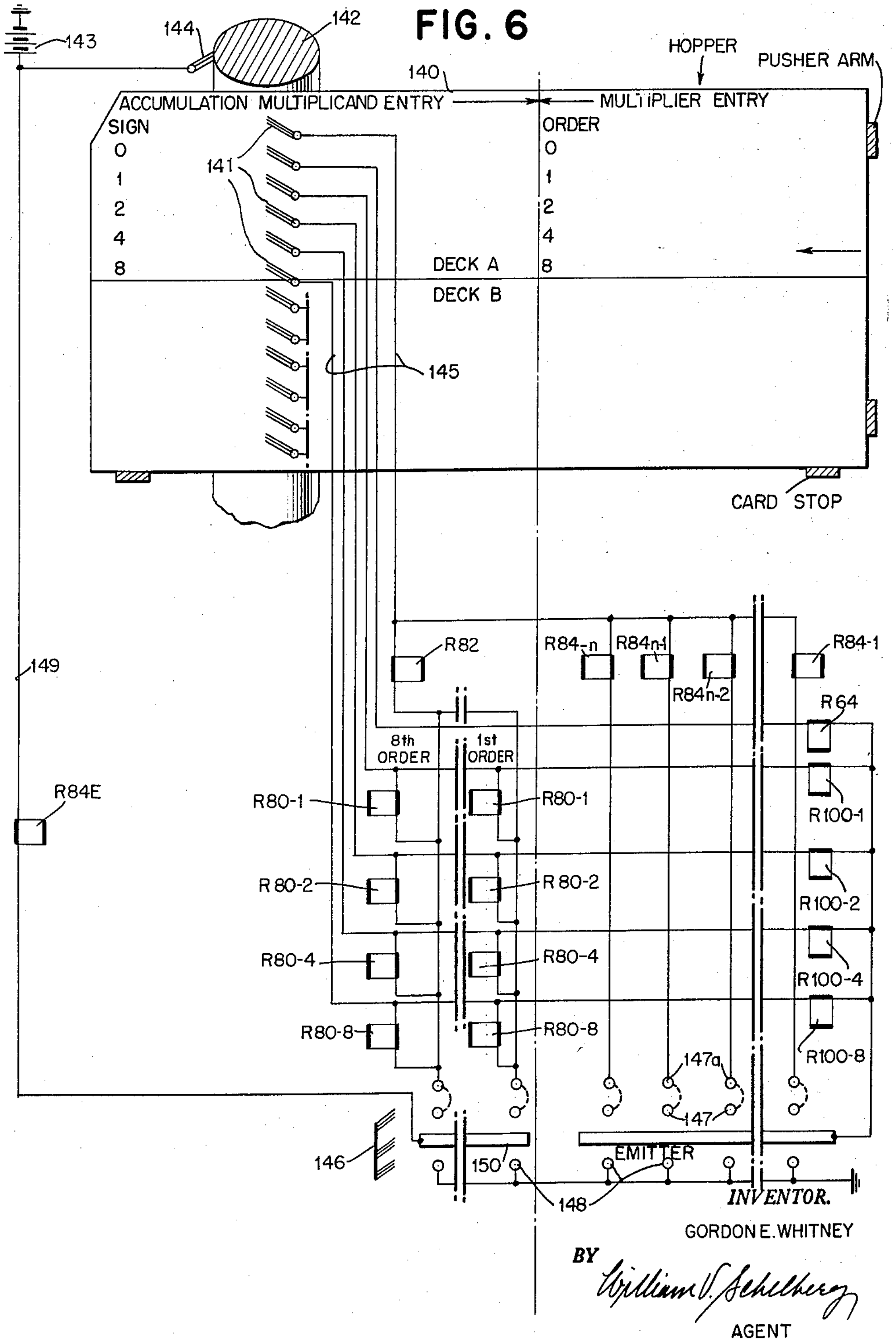

In explanation of the manner of operation of the arithmetic unit, an example of addition will first be traced with the assumption made that each of the above described components is set in an initial zero state. The several order groups of multiplication and entry storage contacts 80 are operated in succession as columns of a record card 140 are read one at a time starting with column one and progressing toward column eighty. The record card and sensing apparatus are shown in Figure 6 where it is observed that the card is punched in the 1—2—4—8 modified binary code. A conventional card with decimal perforations, however, may be used with minor circuit modifications. The digit to be set up in the entry contacts 80 is sensed order by order in a prescribed region of upper or lower deck of the card 140 and, as one or more of a set of brushes 141 make contact with a contact roll 142, circuits are completed through a brush 144, the contact roll 142, reading brush 141, a lead 145, one or more relay windings R80–1, R80–2, R80–4, R80–8 and R82 and a contact 146 of an emitter device. The contact 146 moves in synchronism with the record card through mechanical apparatus not shown and connects a terminal hub 147 provided at each column position and a corresponding one of a set of hubs 147–a connected thereto by plugwires to a set of grounded terminal hubs 148. A perforation in the conventional zone position of the record card is employed for the accumulation of negative numbers and, when sensed by the brush 141 provided in this position, completes a circuit through a relay R82 which picks up the contacts 82 (Fig. 4) and alters the current paths through the entry contacts 80 so that the 9's complement of the digit read by the numerical position brushes 141 rather than the true number is entered into the counters 52. The contacts 80, closed by energization of the read relays, complete circuits from the several lines 76 to 79 through the isolating diodes 81 so that pulses corresponding in number to the digit read from the card 140 are applied through the leads 83 to the shift relay points 84. Shift points 84 are operated in accordance with the order of a multiplier in performing multiplication by over and over addition and direct the pulses appearing on leads 83 to the proper orders of the accumulating devices 52. As shown in Figure 6, a relay 84E for the first order of the shift relay points is energized through a lead 149 and an emitter contact strip 150 so that for accumulation and multiplicand entry, the first order is employed. A section of the same record card 140 may be reserved for multiplier digits and, when passed under the sensing brushes 141 at this section, circuits are set up for a group of relays R100–1, R100–2, R100–4 and R100–8 while the brush 141 formerly used for sensing of the algebraic sign now energizes a relay R84 at each column position closing the proper order position shift contacts to direct the entry of pulses to successive order positions.

After the accumulation and multiplicand portion of the card 140 has been read and the entry contacts 80 set up, that operation period of the machine cycle begins during which the entry of pulses from the advancing counter 50 occurs as controlled by cam contacts whose timings are illustrated in Fig. 7. This timing chart indicates the relative times of closure of the operating cam contacts and is intended to cover only a portion of a complete machine cycle since the extent of one cycle is dependent upon the number of digits to be handled in the accumulator as well as upon the number of multiplier digits provided within the capacity of the machine. Since both of these factors are variable a period covering read out of only one accumulator order and multiplication by only one multiplier order is shown. The card sensing period during which the left hand card portion or accumulation value is sensed and the relays 80 set up takes place from 20° to 40° with the first order of the multiplicand sensed and the contacts 100 set up between 40° and 46°. Entry of a value into the accumulator takes place from 46° to 48° in the case of accumulation and from 46° to 64° in the case of multiplication with a 2° period provided for each over and over entry up to the maximum of 9. The interval from 66° to 72° is provided for resetting the multiplier cycle control counter after each order of the multiplier has functioned to control the iterative entry. In each additional multiplier order provided in the machine a further period repeating the relative closure of contacts for the interval between 40° and 72° is required and a further 32° period is added to the cycle portion shown. The period provided for reading out an accumulated total from one order of the counters is indicated from 2° to 20° with plate potential applied to the output tubes 125 throughout this interval, the basic pulse generator activated between 10° and 12° for producing the ten pulses for read out and the counter 52 of that order reset to an initial zero state if hub 107 is plugged as described during the interval from 14° to 20°. For each accumulator order provided, a like 18° interval is required. For accumulation, an entry hub 151 (shown in Figure 5) for the selected counter group, is plugged for energization from a +40 volt source not shown as a breaker CR152 is closed. This occurs for a period of from 4° to 40° as shown in the timing chart and causes a relay R153 to be energized. This relay closes its contacts 153–1 so that the pick up winding of the relay R54 is energized as the contacts CR64 close from 20° to 64° completing a circuit from the aforementioned +40 volt source. At this time relay R63 is also energized and its normally open contacts 63–1 to 63–4 (shown in Figures 3 and 4) are closed. The counter advance contacts CR60 (Fig. 3) close at 46° and remain closed until 64° for the entry operation starting the pulse generator tube 57 and the advancing counter 50 to function. Pulses produced by the latter device now pass the matrix 70 appearing on leads 76 to 79 in groups as described to be selectively directed by the entry contacts 80 to the accumulator orders 52. The pulses pass the 1st order shift points 84, the now closed entry contacts 63–3 and through leads **85*a* and windings 85 of the carry cores 86, pulsing the drive tube networks 53 and passing the pulses produced thereby through the contacts 54–*a*** of the selected counter groups.

As the advancing counter 50 proceeds through its cycle of operation and produces a pulse at its output terminal 26–10, the tube 91 is fired and a pulse appears on the ripple carry line 92 energizing the windings 93 of the carry cores 86. Since the accumulators 52 were initially in a zero state, as assumed, there will be no carry operation upon the first entry and this read out pulse is ineffective. The pulse on terminal 26–10 is also applied through lead 65, contacts 63–2 and 66–1 to lead 68 firing the cycle control tube 62 and biasing the pulse generator tube 57 to cut off after one cycle of the advancing counter 50 is completed.

In accumulating a second digit read from a further record card, the contacts 80 are again operated setting up the second number during the succeeding read operating cycle and the advancing counter 50 completes another arithmetic operation cycle. As any one of the accumulating counters 52 may now pass from a 9's position, a pulse may appear on its associated carry lead 24 passing the diode 25 and now closed entry contact 63–4 causing the drive tube 96 associated therewith to fire. As this carry drive tube network produces an output pulse which is directed through the input winding 94 of the next higher order carry core 86, that core is caused to shift remanence states. Thereafter, as the advancing counter 50 passes its tenth position, pulsing the tube 91 and the ripple carry driving line 92, each of the drive windings 93 of the carry cores is pulsed and that core which has switched remanence states is caused to again revert to its initial condition simultaneously inducing a pulse in the windings 85 of that particular core. This induced pulse fires the driving tube 53 of the next higher order counter 52 and causes a single pulse to be entered therein.

To read out the number accumulated by the counters 52, the read out hub 106 (Fig. 5) of a selected counter group is plugged for energization as the cam operated breaker CR152 closes and is energized at 4° and remains energized until 40° as shown in the timing chart.

Relay R54 is picked up during this interval, being energized through the normally closed contacts 153–1. The order contacts 123 are closed serially order by order and, as the contacts CR60 close thereafter at 10° to 12° in each machine cycle, ten pulses appear through the diode matrix 120 and are applied through line 121, the selected read out order contacts 123 and the normally closed entry contacts 63–3 to the drive tube network 53, causing the selected counter 52 to be advanced one complete cycle. Entry contacts 63–4 are not operated at this time as the entry relay 63 does not become energized until 20° in each cycle when the cam contacts CR64 are closed, therefore, the carry pulses appearing on the leads 24 of the counters 52 do not effect the carry cores 86, but instead appear on line 127 and are applied to the control grids 126 of the counter output tubes 125. During the read out cycle, pulses are also appearing on the leads 129 connected to the screen grids 128 of the tubes 125 in predetermined order so that certain combinations of these tubes are conditioned to fire as the advancing counter passes each successive position. The read cam contact CR132 is closed during this interval, from 2° to 20° as shown on the timing chart, and provides plate potential for the counter tubes 125 so that firing of particular combinations of the tubes 125 energize corresponding ones of the relays 130 to operate manifesting apparatus such as a punch or print device similar to that disclosed in the copending application Serial Number 358,101 which was filed May 28, 1953, now Patent No. 2,774,429.

In performing multiplication, the multiplicand is read from the card in a manner similar to that described for accumulation and the contact groups 80 are set up. The multiplier is read from the same or another card, as described, energizing the relays R100 and setting up one or more of the multiplier contacts 100–1, 100–2, 100–4 and 100–8. Assuming as before that each of the basic counter devices are in an initial position, the multiplier relay R66 and entry relay R63 (Fig. 5) are energized by plugging the hubs 102 and 151 causing closure of contacts 66–1 and 153–1 in accordance with closure of cam contacts CR64 between 20° to 64°. Contacts CR60 are closed during this interval at 46° to 64° and a group of pulses produced by the advancing counter 50 are caused to be entered in the accumulators 52. The output from the tenth core on terminal 26–10 of the advancing counter passes through lead 65, the now closed contacts 63–2 and 66–1 to the drive tube unit 56 and advances the multiplier cycle control counter 55 one position. As the first core of counter 55 flips, a positive pulse appears on its output terminal 26–1, and, if, the multiplier digit set up is a one, this pulse is directed through the now closed contact 100–1, normally closed contacts 100–2, 100–4 and 100–8 to lead 68 firing tube 62 and cutting off the pulse generator tube 57. The multiplier cycle control counter is advanced one position and produces an output pulse each time the advancing counter 50 completes one cycle and, in accordance with the number set up as multiplier in the contacts 100, the advancing counter is cut off after completion of a number of cycles equal to the multiplier order digit. One machine cycle portion comprising a period similar to the 40° to 72° interval illustrated is required for each order of the multiplier as described and the shift relay points 84 are operated to direct the multiplicand into the accumulating counters a number of times corresponding to the multiplier digit and in the proper order position. If the multiplier digit is a zero, the brush 141 (Fig. 6) senses a zero perforation in the record card 140 and energizes relay R64 opening the contacts 64 (Fig. 3) so that with both entry contacts 63–1 and the contacts 64 open, the advancing counter 50 receives no pulses at its input terminal 21 and is inoperative for this machine cycle.

To reset each of the magnetic core components of the arithmetic unit to a remanence state representing zero positions as in clearing the machine, the reset relay hub 107, shown in Figure 5, is connected by plug wires not shown so as to be energized is from CB152 and the reset contact 109–1, and 109–2 are closed as relay 109 is energized from 4° to 40°. The cam contacts 104 close from 14° to 16° and a positive voltage is applied through the now closed contact 109–2, lead 110, coils 111, the contact **54–*a* and to the drive line of the counters 52 of the desired counter group. As the counter drive line is held positive for a relatively long period (two degrees of the reset cycle) the transfer pulse from the core that is read out is ineffective to change the remanence state of the succeeding core and all the cores of each of the counters go to their zero remanence states. Contacts CR105 close from 18° to 20° as shown in the timing chart, and with contacts 109–1 closed, the line 112 is connected to ground. As the contacts 54–*b* are closed at this time, the load line 27 to the accumulating counters is held at ground potential and current flows from ground through the input winding of the first counter core and causes that core to shift to a "one" remanence state. It is to be noted in Fig. 2 that the other terminal of the input winding 12** is biased negatively allowing this direction of current flow and which direction is the same as that for a transfer pulse from the tenth core.

Closure of contacts CR104 and CR105 also pulse lines 113 and 114 in sequence causing an identical resetting action to take place in the multiplier cycle control counter 55.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic core pulse producing component comprising a plurality of magnetic cores arranged in a closed ring with each core interlinked with a first winding connected in series circuit, pulse generator means for energizing said series circuit, second and third windings on said cores, a self-timing transfer circuit between adjacent magnetic cores, said transfer circuit including said second winding on one core and said third winding on the adjacent core and operative to drive said other core to an alternative magnetic state when said series circuit is pulsed, and means coupled to one of said transfer circuits and to said pulse generator means for controlling said pulse generator means so that said alternative magnetic state is circulated around said ring of cores a selected number of times.

2. A magnetic core pulse producing component comprising a plurality of magnetic cores each interlinked with a first winding connected in series circuit, said series circuit including a driving condenser in a charging circuit, means for cyclicly charging and for discharging said driving condenser through said windings, second and third windings on said cores, a circuit between adjacent magnetic cores including said second winding on one core, said third winding on the adjacent core and a transfer capacitor, said transfer capacitor being charged during the period of discharge of said driving capacitor through said series circuit windings from a voltage induced in said second winding on said one core and discharging through said third winding on the other said core to drive said other core to an alternative magnetic state, output terminals coupled to the junctions of said transfer capacitor and said second windings of each of said plurality of cores, and means coupled with the output terminal associated with the last of said plurality of magnetic cores for selectively controlling said means for cyclicly charging and discharging said driving condenser.

3. A magnetic core counter device comprising a plurality of magnetic cores each interlinked with a first winding connected in series circuit, means for pulsing said series circuit, a self-timing transfer circuit between adjacent ones of said magnetic cores including a second winding on each core and a third winding on the next adjacent core and a pulse transfer capacitor, said pulse transfer capacitor being charged during pulsing of said series circuit and thereafter discharging through the third winding of the adjacent core to drive the adjacent core to an alternative magnetic state, and resetting means including means for energizing said series circuit for a period of time greater than that of said self-timing transfer circuit to thereby cause discharging of said transfer capacitor to be ineffective in driving said other core to an alternative magnetic state.

4. An accumulator comprising a plurality of magnetic cores arranged in units corresponding in number to orders of a multi-digit number to be accumulated, each order unit comprising N cores interlinked with a first winding connected in a series circuit; second and third windings on said cores, a self-timing transfer circuit between adjacent cores of each unit including said second winding on one and said third winding on the adjacent core and a pulse transfer capacitor, said transfer capacitor being charged during application of a digit representing pulse to said order unit series circuit and discharging hereafter through the third winding of the other of said cores to drive the other of said cores to an alternative magnetic state; a carry core for each of said units; input, output and drive windings on each said carry core; means connecting said input winding of each carry core for energization on receipt of N digit representing pulses by its associated order unit; means coupling said series circuit of each order unit with the output winding of the next lower order carry core; and means for pulsing said carry core drive windings.

5. An arithmetic unit comprising a pulse producing component, an accumulator component and a multiplier cycle control component, each of said components comprising a plurality of magnetic cores each interlinked with a first winding connected in series circuit, second and third windings on said cores and a self-timing transfer circuit between adjacent cores including said second winding on one and said third winding on the next adjacent core and operative to cause said adjacent core to assume an alternative magnetic state when said drive windings are pulsed, output terminals connected to each of said transfer circuits of said plurality of cores forming said pulse producing and said multiplier cycle control components, entry means coupling output terminals of said pulse producing component selectively to the first winding series circuit of said accumulator componet, circuit means connecting an output terminal of said pulse producing component to the drive winding series circuit of said multiplier cycle control component, pulse generator means for driving said pulse producing component, and further entry means coupled to said pulse generator means and to an output terminal of said multiplier cycle control counter component to selectively control and said pulse generator means.

6. An arithmetic unit comprising an advancing counter component, an accumulator component and a multiplier cycle control component, each of said components comprising an array of N magnetic cores interlinked with a first winding connected in series circuit and a self-timing transfer circuit including a transfer capacitor connected between adjacent cores and including a second winding on one core and a third winding on the next adjacent core, said transfer circuit being operative to cause the next core to assume an alternative magnetic state when said drive windings are pulsed, output terminals connected to each of said transfer circuits of said array of cores forming said advancing counter component and said multiplier cycle control component, pulse generator means coupled to the drive winding circuit of said pulse producing component, circuit means coupled to predetermined ones of the output terminals of said advancing counter component, multiplicand and entry contact means connected between said circuit means and the first windings of said accumulator component, further circuit means connecting the output terminal connected to the Nth transfer circuit of said advancing counter component and to the drive winding circuit of said cycle control counter component, multiplier entry contacts connected between the output terminals of said multiplier cycle control counter and said pulse generator means and operative thereby to control said pulse generator on completion of a predetermined number of cycles of operation of said advancing counter component.

7. Apparatus as set forth in claim 6 including read out means for manifesting data stored by said accumulator component comprising means coupled to predetermined ones of said circuit means and to the drive winding of said accumulator whereupon operation of said advancing counter drives said accumulator through one complete cycle of N operations.

8. A magnetic core pulse producing device comprising an advancing counter component and a cycle control component, each of said components comprising an array of N magnetic cores arranged in cascade with each core interlinked with a first winding connected in series circuit, second and third winding on said cores, a self-timing transfer circuit connected between adjacent ones of said cores and including said second winding on one core and said third winding on the adjacent core and operative to drive said adjacent core to an alternative magnetic state when said series circuit is pulsed; output terminals coupled to said transfer circuits; an oscillator, circuit means connecting said oscillator and the series circuit of said advancing counter; circuit means connecting the Nth output terminal of said advancing counter with the series circuit of said cycle control component; and means for controlling said oscillator comprising means connected to a selected one of the output terminals of said cycle control component and to said oscillator whereupon said advancing counter completes a predetermined selected number of cycles of operation.

9. A magnetic core transfer circuit comprising a plurality of magnetic cores each interlinked with a first winding connected in series circuit, means for pulsing said series circuit, second and third windings on said cores, a transfer circuit between said magnetic cores including said second winding on one core and said third winding on the adjacent core and operable to drive the adjacent core to an alternative magnetic state from a datum state when said one core is in an alternative magnetic state and is reset to the datum state on pulsing of said series circuit, and resetting means including means for energizing said series circuit for a period of time sufficient to prevent said other core from attaining said alternative magnetic state.

References Cited in the file of this patent

UNITED STATES PATENTS

| | | |
|---|---|---|
| 2,176,932 | Smith | Oct. 24, 1939 |
| 2,192,612 | Lang | Mar. 5, 1940 |
| 2,409,689 | Morton | Oct. 22, 1946 |
| 2,575,331 | Compton et al. | Nov. 20, 1951 |
| 2,591,406 | Carter et al. | Apr. 1, 1952 |
| 2,641,407 | Dickinson | June 9, 1953 |
| 2,652,501 | Wilson | Sept. 15, 1953 |
| 2,697,178 | Isborn | Dec. 14, 1954 |
| 2,733,861 | Rajchman | Feb. 7, 1956 |

OTHER REFERENCES

Ramey: The Single-Core Magnetic Amplifier as a Computer Element, AIEE Transactions, vol. 71, part I, 1952, pages 442 to 446.

"Magnetic Shift Register Using One Core Per Bit" by Kodis et al. part 7, Convention Record of the IRE 1953 National Convention, pages 38–42.

UNITED STATES PATENT OFFICE

CERTIFICATE OF CORRECTION

Patent No. 2,923,472 February 2, 1960

Gordon Earle Whitney

It is hereby certified that error appears in the printed specification of the above numbered patent requiring correction and that the said Letters Patent should read as corrected below.

Column 13, line 8, for "componet" read -- component --; line 16, before "said" strike out "and"; column 14, line 4, for "winding" read -- windings --.

Signed and sealed this 11th day of April 1961.

(SEAL)
Attest:

ERNEST W. SWIDER
Attesting Officer

ARTHUR W. CROCKER
Acting Commissioner of Patents